United States Patent
Forman et al.

(10) Patent No.: US 6,829,631 B1
(45) Date of Patent: Dec. 7, 2004

(54) METHOD AND SYSTEM FOR SCREENING ELECTRONIC MESSAGES

(75) Inventors: Ira Richard Forman, Austin, TX (US); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 09/666,274

(22) Filed: Sep. 21, 2000

(51) Int. Cl.⁷ .............................................. G06F 15/16
(52) U.S. Cl. ..................................................... 709/202
(58) Field of Search ................................ 709/217, 202, 709/203, 200

(56) References Cited

U.S. PATENT DOCUMENTS

| | | | |
|---|---|---|---|
| 5,635,918 A | * 6/1997 | Tett | 340/7.29 |
| 5,694,616 A | 12/1997 | Johnson et al. | 395/860 |
| 5,742,769 A | 4/1998 | Lee et al. | 395/200.36 |
| 5,781,857 A | 7/1998 | Hwang et al. | 455/412 |
| 5,805,810 A | 9/1998 | Maxwell | 395/200.36 |
| 5,859,967 A | 1/1999 | Kaufeld et al. | 395/186 |
| 5,944,787 A | 8/1999 | Zoken | 709/206 |
| 5,987,609 A | 11/1999 | Hasebe | 713/200 |
| 5,999,932 A | * 12/1999 | Paul | 707/10 |
| 6,047,310 A | * 4/2000 | Kamakura et al. | 709/201 |
| 6,073,165 A | * 6/2000 | Narasimhan et al. | 709/206 |
| 6,266,692 B1 | * 7/2001 | Greenstein | 709/206 |

FOREIGN PATENT DOCUMENTS

EP        0 946 022 A2    9/1999    ........... H04L/12/58

* cited by examiner

*Primary Examiner*—David Y. Eng
(74) *Attorney, Agent, or Firm*—Mark E. McBurney; Anthony V. S. England (57) ABSTRACT

A method, system, apparatus and computer program product are disclosed for screening electronic messages, wherein a sentry determines whether electronic messages to a receiver include respective passes from the receiver. Responsive to such a message having a pass, the receiver is notified about the message. Responsive to the message not having a pass, a notice for the sender is generated about a pass for the message. Ultimately the pass is generated and sent, on behalf of the designated receiver of the message, to the sender. Unless the sender of the electronic message receives the pass which was returned to the sender by a screening agent for the designated receiver, and the sender returns the pass to the receiver, then the screening agent discards the message and the receiver will not ever be burdened with the message. Thus, if the sender's message has an invalid electronic message reply address, as is frequently the case for mass marketing senders, the sender will never receive the pass, and the receiver's screening agent will discard the message. Both the pass generation and sender notification may be without regard for the identity of the sender. That is, responsive to every message for which the screening agent has not already generated a pass, the recipient's screening agent automatically generates a pass and sender notification. Therefore, no significant burden is placed on the designated recipient even to merely set up rules for screening messages.

28 Claims, 10 Drawing Sheets

METHOD AND SYSTEM FOR SCREENING ELECTRONIC MESSAGES

BACKGROUND OF THE INVENTION

1. Technical Field

The present invention is related generally to electronic messages transmitted from and to users of a data processing system, and more particularly, to screening of such messages.

2. Description of Related Art

The proliferation of e-mail has bad many beneficial effects, but has unfortunately had at least one negative side effect. That is, there has also been a proliferation in junk e-mail, also known as "spam," the receipt of which is often unwanted by a computer user. Not only is unwanted junk e-mail a nuisance to the recipient, but data processing resources which could be put to better use are devoted to processing the unwanted e-mail.

Furthermore, other types of electronic messages are also popular, such as "instant messaging" which is communicated in a somewhat different way than e-mail. Instant messaging has certain privacy features which tend to make this communication medium less subject to unwanted messages. For example, in some instant messaging systems a user limits whose instant messages the user will receive by specific enumeration of authorized senders. It is nevertheless anticipated that unwanted electronic messages may rise to a burdensome level, even in communication media other than just e-mail. Therefore a need exists to reduce the burden on users who are targets of unwanted electronic messages, including e-mail, and to discourage the sending of spam.

SUMMARY OF THE INVENTION

The present invention addresses these needs by way of a method, system, apparatus and computer program product for screening electronic messages, wherein a sentry (a.k.a. "screening agent," a.k.a. "screening tool") determines whether electronic messages to a receiver include respective passes from the receiver. Responsive to such a message having a pass, the receiver is notified about the message. Responsive to the message not having a pass, a notice for the sender is generated about a pass for the message. Ultimately the pass is generated and sent, on behalf of the designated receiver of the message, to the sender. Unless the sender of the electronic message receives the pass which was returned to the sender by a screening agent for the designated receiver, and the sender returns the pass to the receiver, then the screening agent discards the message and the receiver will not ever be burdened with the message. Thus, if the sender's message has an invalid electronic message reply address, as is frequently the case for mass marketing senders, the sender will never receive the pass, and the receiver's screening agent will discard the message. Both the pass generation and sender notification may be without regard for the identity of the sender. That is, responsive to every message for which the screening agent has not already generated a pass, the recipient's screening agent automatically generates a pass and sender notification. Therefore, no significant burden is placed on the designated recipient even to merely set up rules for screening messages.

It is an advantage of the invention that unless the sender of a first electronic message obtains a pass and returns it to the designated receiver, then the screening agent for the receiver may discard the first message and the designated receiver will not ever be burdened with the message. In addition, it is an advantage that the invention will discourage the use of invalid reply addresses, such as is widely done by mass marketing agents. This will tend to improve the ability of a recipient of unwanted e-mail to determine who is the sender of the e-mail, thereby providing the recipient more avenues for counteraction, which will tend to reduce unwanted messages.

In a feature of the above described embodiment, the designated recipient's screening agent automatically generates a notification for the sender, which may include automatically generating a pass and automatically sending the pass to the sender. It is an advantage of these features that for the designated recipient of an electronic message, the message screening is transparent, placing no significant burden on the designated recipient to screen messages one-by-one, i.e., on a case by case basis.

These and other advantages of the invention will be further apparent from the following drawings and detailed description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
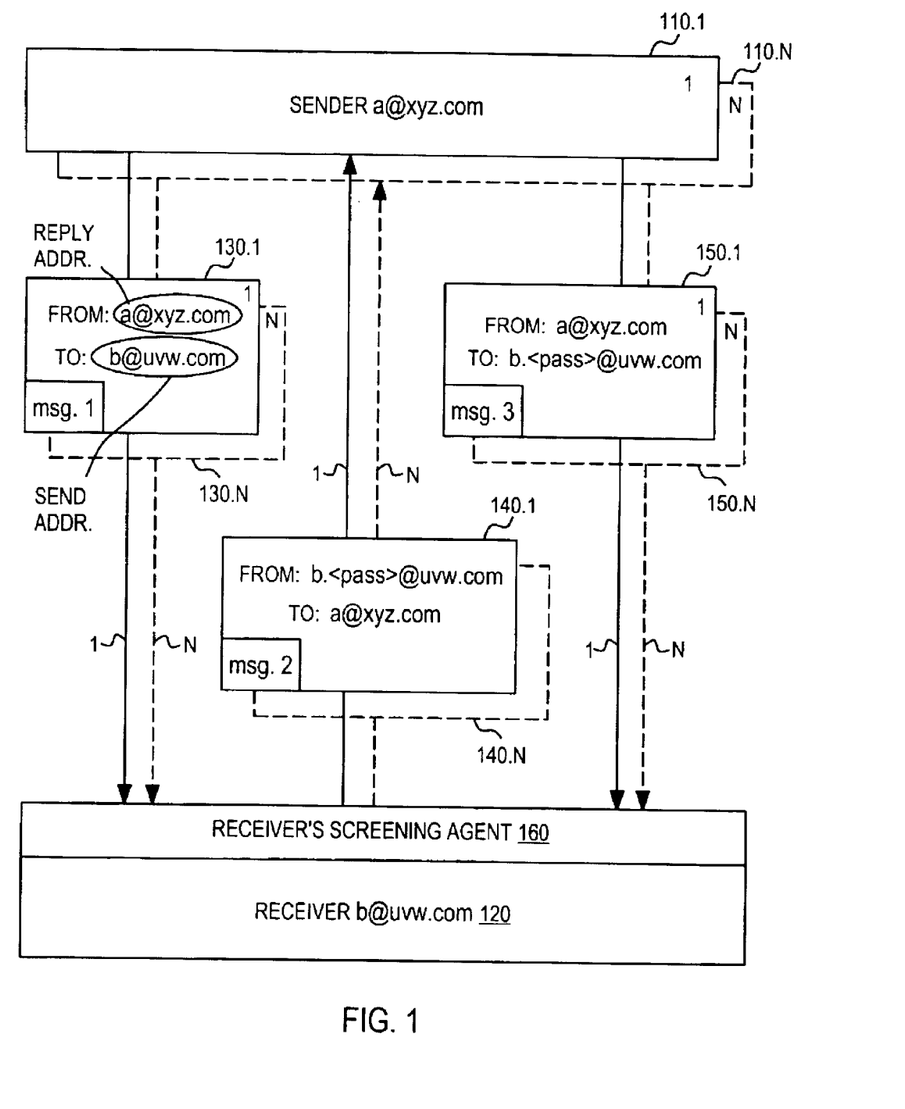
FIG. 1 illustrates sequences of three messages, according to an embodiment.

Referring now to FIG. 1, a plurality of sequences of messages are illustrated, according to an embodiment of the invention. The plurality of first messages, 130.1 through 130.N, are from a corresponding plurality of senders 110.1 through 1110.N, and are all addressed to a single designated receiver 120. For each of the first messages, 130.1 through 130.N, the receiver's screening agent 160 generates corresponding second messages, that is, reply messages, 140.1 through 140.N. For each of the second messages, 140.1 through 140.N, the sender's, 110.1 through 110.N, may generate corresponding third messages, 150.1 through 150.N, back to the designated receiver 120. Although N third messages, 150.1 through 150.N, are shown in FIG. 1, it should be understood there will only be N third messages generated and returned to the designated receiver 120, if all N senders, 110.1 through 110.N, used a valid reply address in corresponding first messages, 130.1 through 130.N, and then responded to the second messages, 140.1 through 140.N, as will be further appreciated from the following, more detailed description of one of the sequences of first, second and third messages.

The first sequence of first, second, and third messages, 130.1, 140.1 and 150.1 respectively, is now described. Since this description of the sequence of three messages could equally apply to any of the sequences 1 through N, and for convenience, this description will omit reference to the sequence number "1" and simply refer to "first message 130," "second message 140," "third message 150," and "sender 110" although it should be understood that the description is literally of first message 130.1, second message 140.1, third message 150.1 and sender 110.1.

The first message, message 130, is from a sender 110. The sender has a reply address "a@xyz.com." The designated receiver 120 has a reply address "b@uvw.com." Thus, the first message has a send address of "b @ uvw.com," and a reply address of "a@xyz.com."

Responsive to the first message, the designated receiver's screening agent 160 parses the send address, that is, "b@uvw.com," and responsive to determining that the send address does not include a valid pass, generates a second message, message 140. Since the second message is from the receivers screening agent for the designated receiver of the first message, to the sender of the first message, the second message has a send address of "a @ xyz.com." However, the reply address, instead of saying "b@uvw.com," has a "." added after the "b" and a string of alphanumeric characters, represented in FIG. 1 as "<pass>," inserted between the "." and the "@" The "." serves as a delimiter, and is merely to simplify parsing of the reply address, which will be later described. It should be understood that another symbol could be substituted for the ". "or the "." could be omitted. For example, the pass may be a predetermined number of characters, so that it may parsed as that predetermined number of characters in the address which are immediately to the left of the "@."

Included in the message 140 is an indication to sender 110 that the sender should generate another message, that is, the third message 150, which uses the reply address from the second message 140 as the send address for the third message. This reply address from the second message 140 is the reply address, previously described, having the pass embedded therein.

When the receiver's screening agent 160 receives the third message 150, the screening agent parses the send address to extract the pass, and further processing is done to determine whether the message 150 is forwarded to the designated receiver 120, as will be further described in the following.

Figure 2:
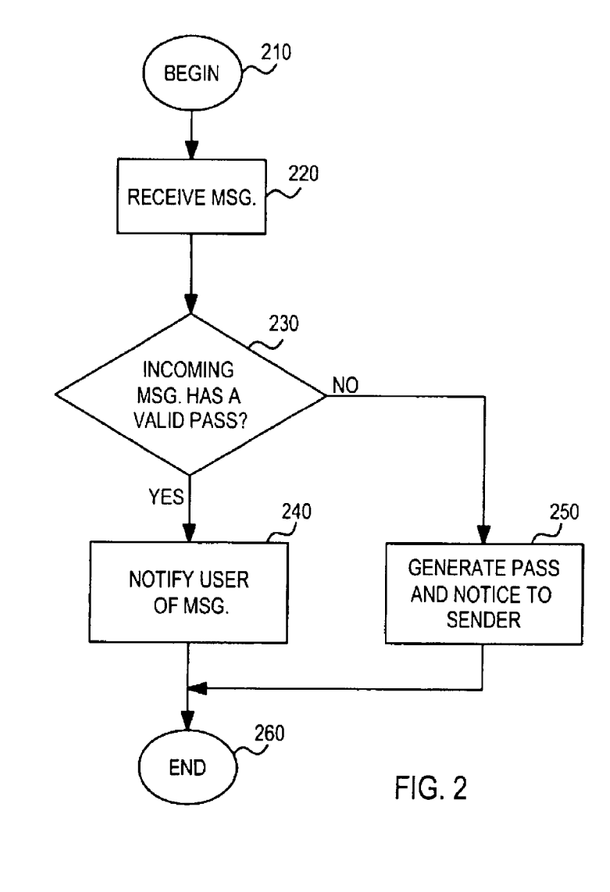
FIG. 2 illustrates an embodiment of the sentry, including a pass detection agent, a notification agent, and a forwarding agent.

Referring now to FIG. 2, an algorithm is shown, in flow chart format, which illustrates an embodiment for sentry 160. The algorithm begins at block 210. Next, a message is intercepted by the designated receiver's intercepting agent 220. Next, a pass detection agent 230 gets the message from agent 220 and determines whether the incoming message has a valid pass for the designated receiver. If the message has a valid pass, then agent 230 gives the message to forwarding agent 240, which forwards the message to the designated receiver, or at least notifies the receiver of the message. If the message does not have a valid pass, then agent 230 gives the message to a notification agent 250, which generates a pass and a notice about the pass to the sender. Notifying the sender, in the illustration of FIG. 1, includes automatically sending the second message to the sender, with the pass embedded in the reply address of the second message, and indicating to the sender that the sender should re-send to the altered reply address.

It should be understood in connection with the above, that in the embodiment, the receiver's screening agent 160 is not selective in responding to messages which it receives. That is, the receiver's screening agent automatically examines every message which it receives for a valid pass, and, if the message does not have a valid pass—that is, a pass which the screening agent itself generated earlier—the screening agent automatically generates the pass every time, and notifies the sender of the pass.

Figure 4:
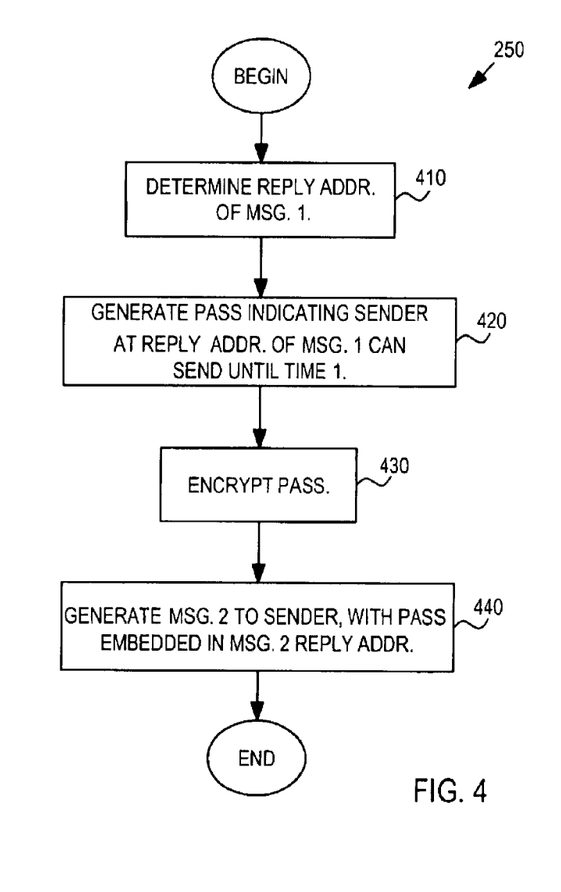
FIG. 4 illustrates details of the notification agent.
Figure 7:
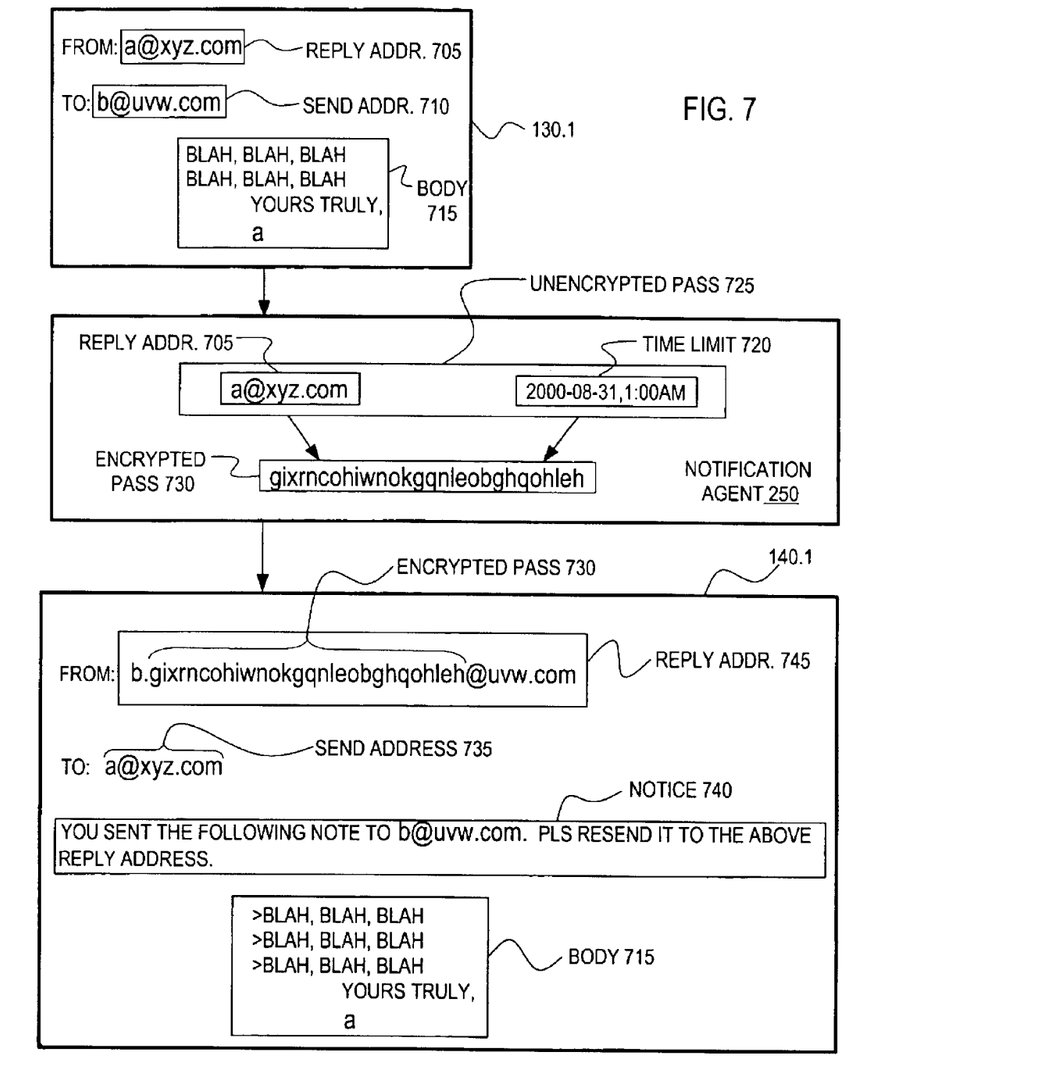
FIG. 7 shows details for notifying a sender about a pass.

Referring now to FIG. 4, details are shown of FIG. 2, notification agent 250, which concerns generating a pass and notice to the sender, for example, the sender of a first message, i.e. "msg. 1." For example, the first message may be message 130.1 of FIG. 1, which is shown in more detail in FIG. 7.

In step 410 of FIG. 4, the reply address of the incoming message is determined. In the example of FIG. 7, the reply address 705 is "a@xyz.com."

Next, in step 420 of FIG. 4, a pass is generated. As shown in FIG. 7, the pass 725 indicates the reply address 705 as the address for an authorized sender, and indicates an expiration time 720 after which the pass will no longer be valid. Thus, before it is encrypted, the pass character string would look like this for example, "a@xyz.com,2000-08-31, 11:00 AM."

Next, in step 430, the pass is encrypted. That is, in FIG. 7 for example, the un-encrypted character string 725, "a@xyz.com,2000-08-31, 11:00AM," is transformed using some well-known encryption technique into an unintelligible string 730.

Next, in step 440 of FIG. 4, the encrypted pass is embedded in the reply address for the message. Thus, for the example in FIG. 7, the send address 710 in message 130.1 is combined with the pass 730 to provide the reply address 745 for message 140.1

Figure 3:
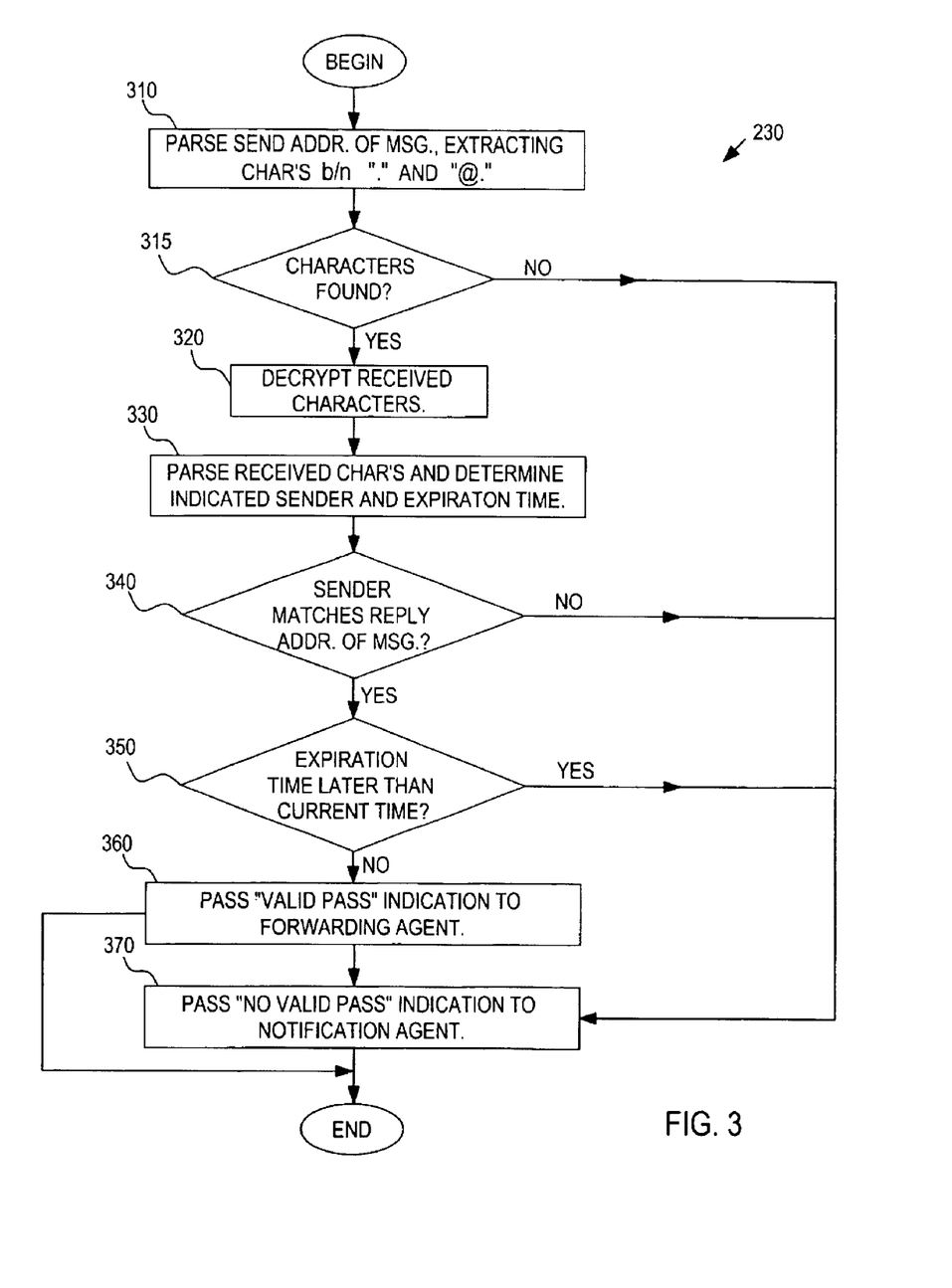
FIG. 3 illustrates details of the pass detection agent.

Referring now to FIG. 3, details are shown of FIG. 2, pass detection agent 230. For an incoming message a send address is first parsed, as shown in step 310. For example, see FIG. 8, which shows message 150.1 from FIG. 1 in more detail. The send address 808 from the message 150.1 is parsed by the sentry 160. Characters between the first". "and the "@" are extracted by the parsing. These characters represent, in encrypted form, a possible valid pass 730.

Next, in FIG. 3, at step 315 a determination is made whether any characters were found by the parsing which might qualify as a valid pass. If no possibly qualifying characters are found, then the agent 230 branches to 370, and an indication is returned that the incoming message does not have a valid pass. For example, if the incoming message is message 130.1 of FIG. 1, this "no valid pass" indication would apply, since the message does not even have a delimiter "." to the left of the "@" character, and therefore also has no other characters (represented herein generically by "<pass>") between a "." delimiter and the "@" character.

Next, at step 320 of FIG. 3, if characters possibly qualifying as a pass are found, they are decrypted. For example, for message 150.1 in FIG. 8 the pass detection agent 230 converts encrypted pass 730 to decrypted pass 815.

Then, at step 330 of FIG. 3, the decrypted characters are analyzed and further parsed, to determine an indicated sender and time limit. For the example of message 150.1 in FIG. 8, decrypted pass 815 is parsed into an indicated sender 820 and indicated time 825.

Figure 8:
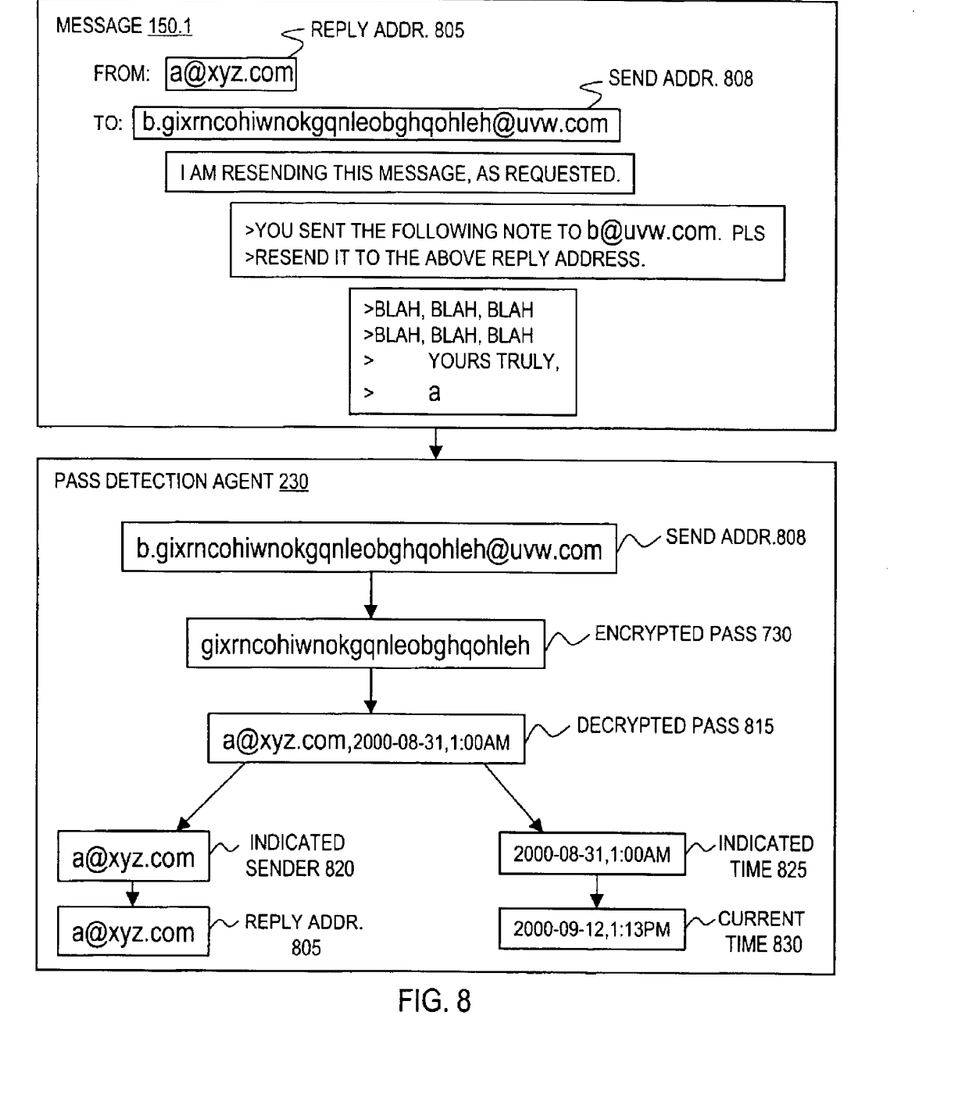
FIG. 8 shows details for pass detection.

Next, at step 340 of FIG. 3, the reply address of the message is compared to the sender and time limit indications from the decrypted characters. In the example of FIG. 8, the reply address 805 of message 150.1, i.e., "a@xyz.com," is compared to the indicated sender 820, also "a@xyz.com." If the sender indicated does not match the reply address, then, the pass detection agent 230 in FIG. 3, at 370, passes an indication to notification agent 250 that the incoming message does not have a valid pass. If the sender indicated by the pass does match the reply address, as it does in the example of FIG. 8, then, at block 350 in FIG. 3, the time indicated by the pass is compared to the current time, as shown in FIG. 8, wherein indicated time 825 is compared to current time 830.

If the time limit has been exceeded, then, at block 370, the pass detection agent 230 passes the indication that there is no valid pass to notification agent 250. If the time limit indicated by the pass has not been exceeded, then, in FIG. 3 at block 360, the agent 230 passes an indication to forwarding agent that the incoming message has a valid pass.

Figure 9:
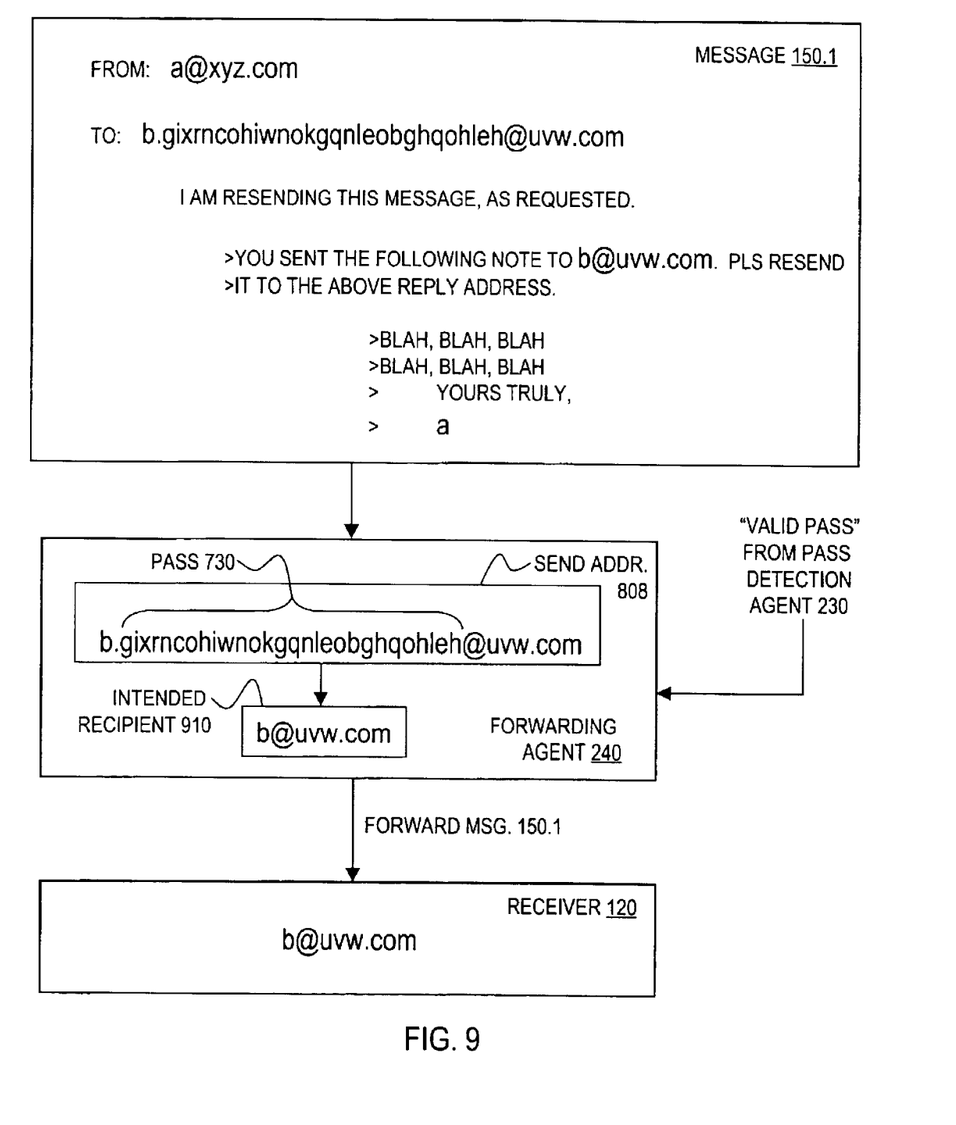
FIG. 9 illustrates details of forwarding to a receiver a message having a pass.

For a message having a valid pass, such as third message 150.1 as shown in FIG. 8, the message is forwarded to the designated receiver by forwarding agent 240 in FIG. 2. Details of this are shown in FIG. 9.

Since there is no user in the system which has an actual address like send address 808 in FIG. 8, to notify the user a mechanism is included to recognize the send address of the message 150.1. That is, the sentry 160 interacts with conventional features of an e-mail server to identify the recipient of the third message 150. According to the embodiment shown in FIG. 9, the forwarding agent 240 parses the send address 808 of incoming message 150.1 to remove the pass 730 therefrom. The resulting address 910 indicates an intended recipient. The agent 240 compares this address 910 with the e-mail database of users. If there is a user 120 which matches address 910, then, responsive to an indication, as described in connection with FIGS. 3 and 8, that the pass for message 150.1 is valid, the agent 240 forwards the message 150.1 to the user 120.

In an alternative embodiment, in connection with sending a message such as message 140.1 in FIG. 7, the agent 240 causes a user name corresponding to reply address 745 in FIG. 7 be added to a database of valid e-mail addresses, so that when a message such as message 150.1 in FIG. 8 is received, the send address 808 corresponds to the user name that was added when the notification agent 250 sent message 140.1, and the user name is recognized.

Figure 6:
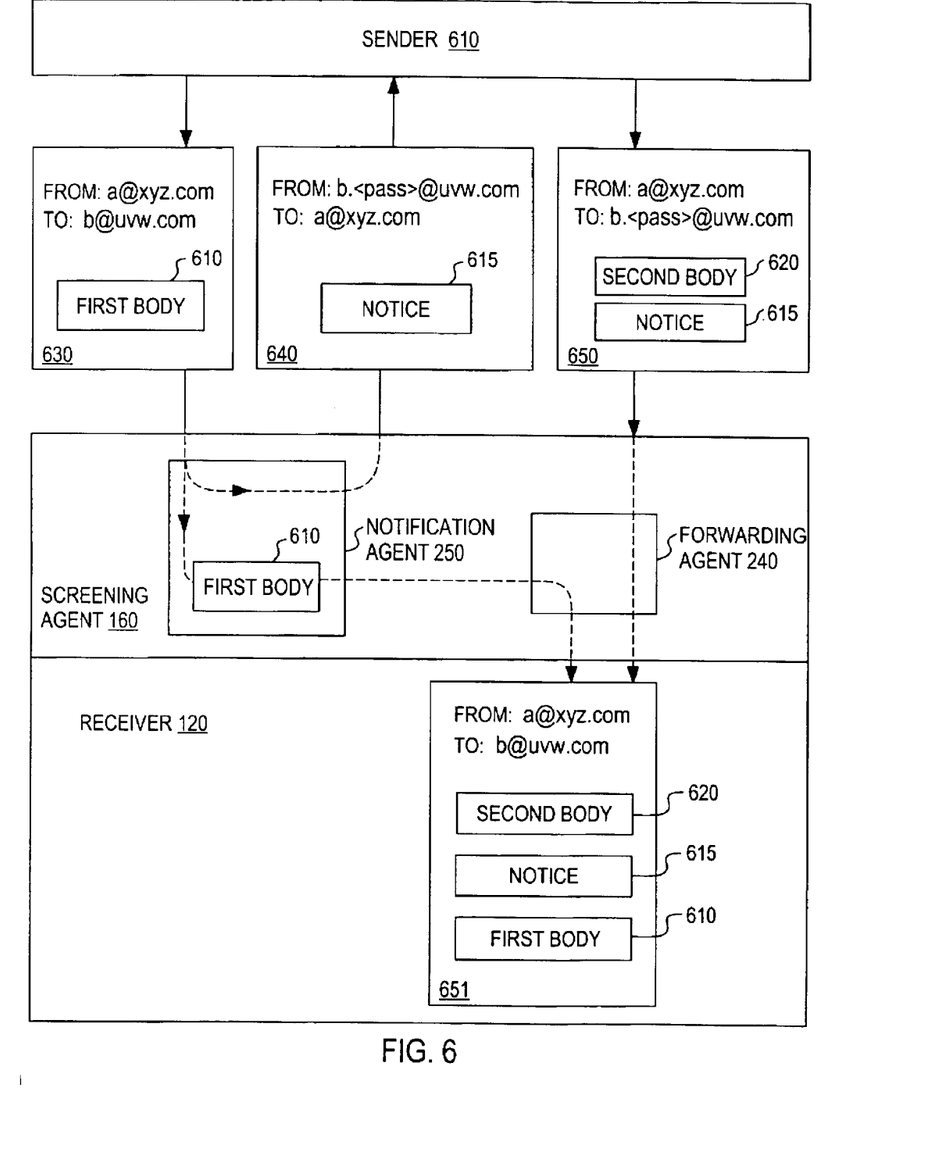
FIG. 6 shows an alternative aspect of how the body of a message is handled.

Referring now to FIG. 6, an alternative aspect of the embodiment is illustrated. In the alternative, the original message from the sender 610, includes body 610, but the second message 640 does not include the body 610. The notification agent 250 of the sentry 160 inserts a notice 615 in the second message 640, and strips out the body 610 of the first message 630, and saves it for possible later use for the forwarding agent 240. Then, if the sentry 160 receives third message 650 corresponding to second message 640, the forwarding agent 240 of the sentry 160 combines body 610 with message 650 before forwarding the combined message 651 to the designated recipient 120, if the third message 650 has a valid pass.

Figure 10:
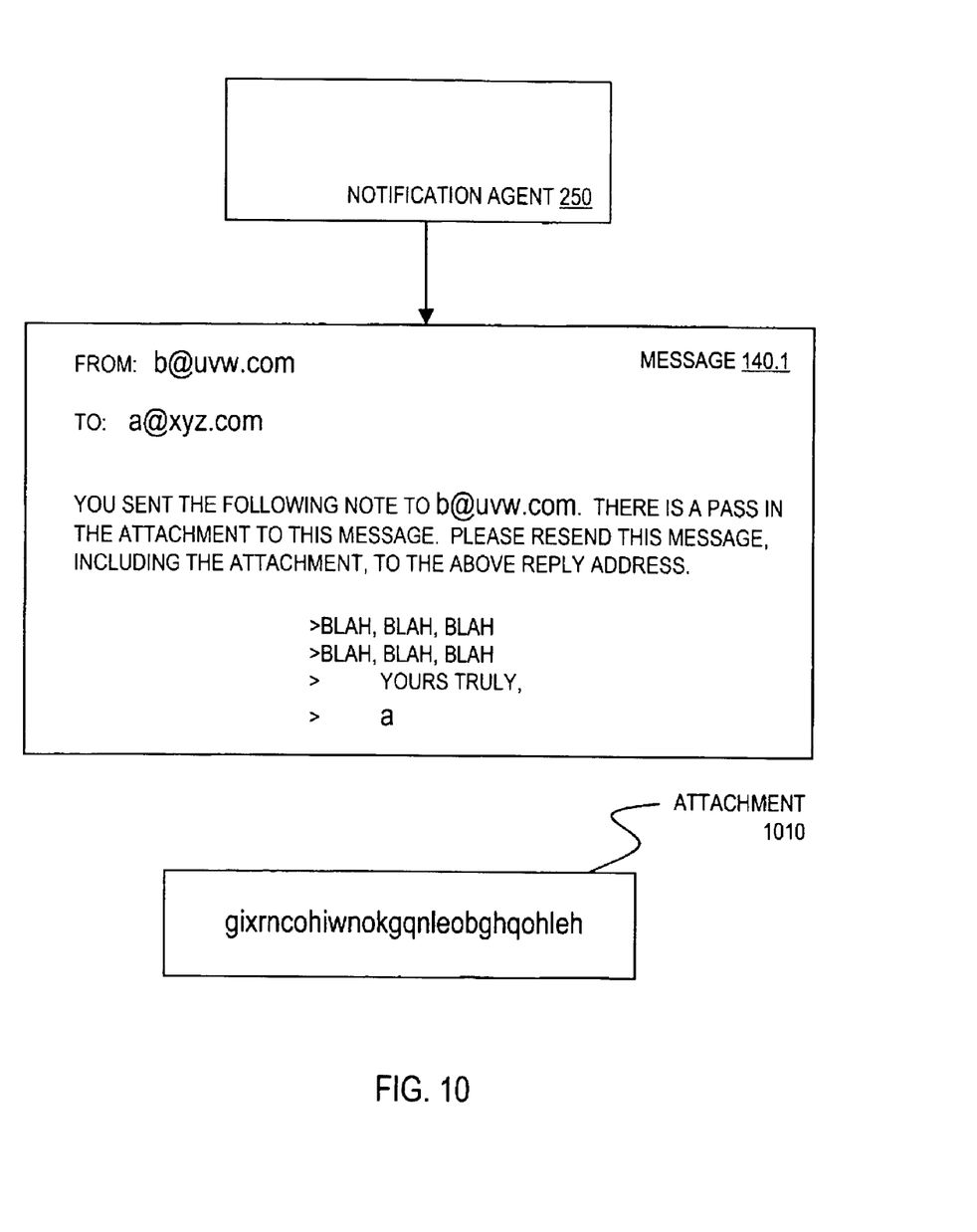
FIG. 10 illustrates an alternative for notifying a sender about a pass.

Referring now to FIG. 10, an alternative embodiment is shown, in contrast to FIG. 7, wherein the e-mail message 140.1, which notifies of the pass 730, points to an attachment 1010 which contains the pass 730, instead of embedding the pass 730 in a reply address 745 of an e-mail message as was shown in FIG. 7.

Figure 11:
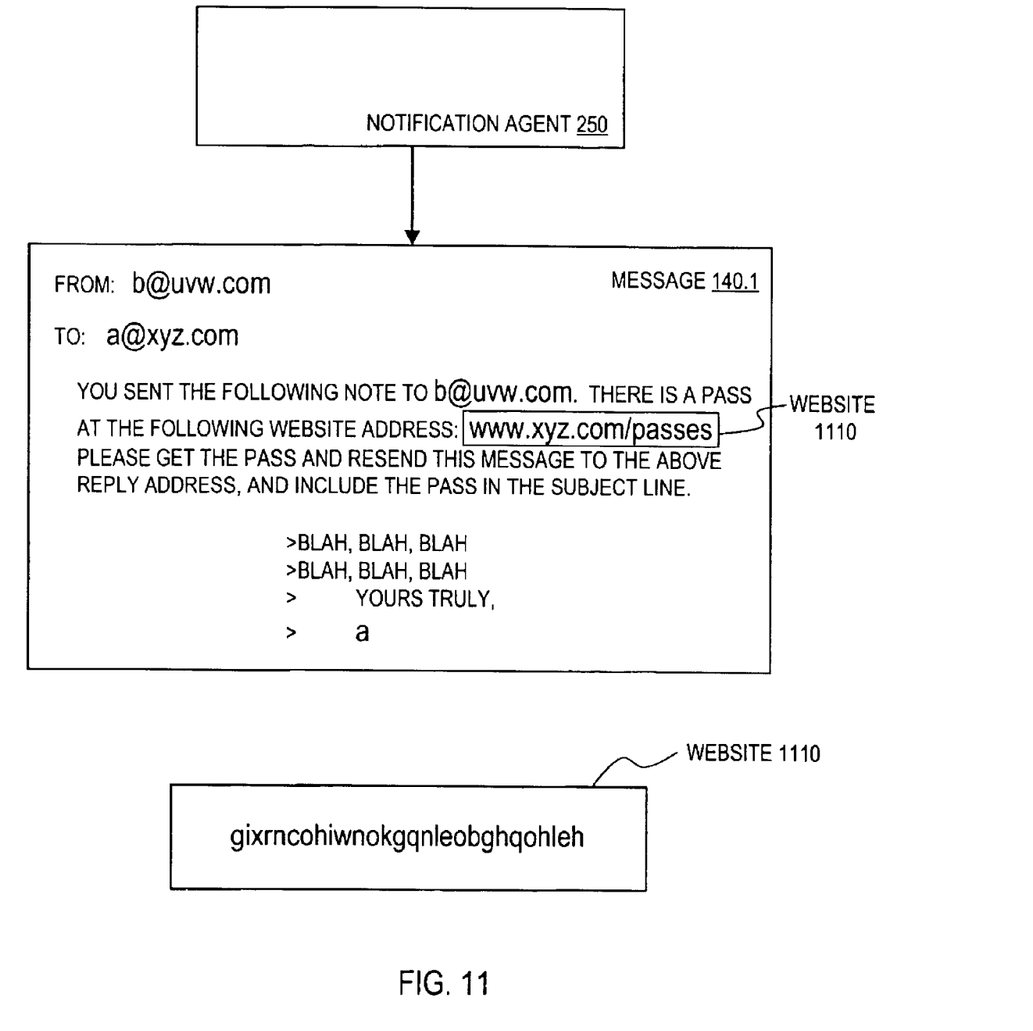
FIG. 11 illustrates another alternative for notifying a sender about a pass.

Referring now to FIG. 11, an alternative embodiment is shown, also in contrast to FIG. 7, wherein the e-mail message 140.1, which notifies of the pass 730, points to a web site 1110 which contains the pass 730.

Figure 5:
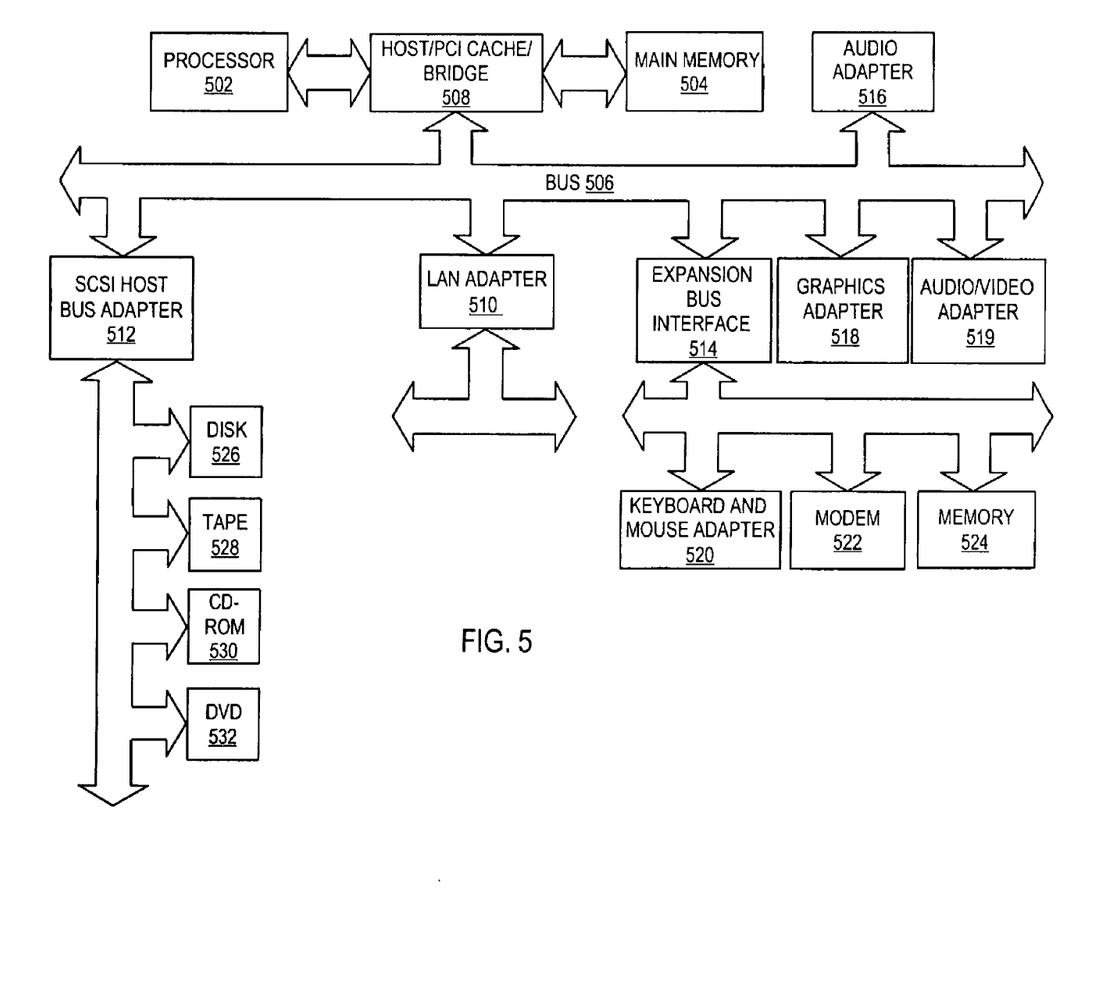
FIG. 5 illustrates, in block diagram form, a data processing system for implementing the disclosed embodiment.

With reference now to FIG. 5, a block diagram of a data processing system in which the present invention may be implemented is illustrated. Data processing system 500 employs a peripheral component interconnect (PCI) local bus architecture. Although the depicted example employs a PCI bus, other bus architectures, such as Micro Channel and ISA, may be used. Processor 502 and main memory 504 are connected to PCI local bus 506 through PCI bridge 508. PCI bridge 508 may also include an integrated memory controller and cache memory for processor 502. Additional connections to PCI local bus 506 may be made through direct component interconnection or through add-in boards. In the depicted example, local area network (LAN) adapter 510, SCSI host bus adapter 512, and expansion bus interface 514 are connected to PCI local bus 506 by direct component connection. In contrast, audio adapter 516, graphics adapter 518, and audio/video adapter (AN) 519 are connected to PCI local bus 506 by add-in boards inserted into expansion slots. Expansion bus interface 514 provides a connection for a keyboard and mouse adapter 520, modem 522, and additional memory 524. In the depicted example, SCSI host bus adapter 512 provides a connection for hard disk drive 526, tape drive 528, CD-ROM drive 530, and digital video disc read only memory drive (DVD-ROM) 532. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 500. Instructions for the operating system, the object-oriented operating system, and applications or programs are located on a storage device, such as hard disk drive 526, and may be loaded into main memory 504 for execution by processor 502.

Those of ordinary skill in the art will appreciate that the hardware in FIG. 5 may vary depending on the implementation. For example, other peripheral devices, such as optical disk drives and the like, may be used in addition to or in place of the hardware depicted in FIG. 5. The depicted example is not meant to imply architectural limitations with respect to the present invention. For example, the processes of the present invention may be applied to multiprocessor data processing systems.

Although the present invention has been described primarily with reference to e-mail communications ones skilled in the art will recognize that the present invention may be applied to create other types of electronic communications. For example, the present invention may be applied to instant messaging over the Internet, and to calls over telephone networks, and by pager or radio.

Also, according to the embodiment shown in the Figures, the pass is generated automatically, and without intentional delay, in response to receipt of every message received by the sentry which does not have a pass. It should be understood that an alternative embodiment within the scope of the invention includes generating the pass after notifying the sender that the sender's message needs a pass, and may include generating the pass only after the sender takes some action to obtain the pass, such as accessing a web page, sending another e-mail message or instant message, etc.

It is important also to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present embodiment has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for screening electronic messages, wherein such an electronic message has a reply address for a sender and an address for a designated receiver of the message, the method comprising the steps of:
   a) determining, by a screening agent for the designated receiver of such a one of the electronic messages, whether the electronic message includes a pass, the pass having been generated by the screening agent from an earlier-received version of the electronic message;
   b) forwarding such a one of the electronic messages to the receiver by the screening agent, responsive to the message having such a pass; and
   c) generating a pass and notice to the sender for such a one of the electronic messages by the screening agent— responsive to the message not having such a pass, wherein the notice includes information making the sass available to the sender and requesting the sender to return the pass—to an indicated address, wherein the pass is particularized for the sender by including in the pass an encrypted version of the sender's address received in the electronic message, and wherein step a) includes determining whether such a one of the electronic messages has such a pass and whether the encrypted address of the pass matches the message's sender address.

2. The method of claim 1, wherein there are a plurality of the electronic messages and the method comprises the step of:
   intercepting the electronic messages by the screening agent for the designated receiver; and
   performing steps a), b) and c) for each one of the respective electronic messages.

3. The method of claim 2, wherein the method comprises the step of:
   sending the respective passes to the respective senders at the reply addresses of the respective electronic messages.

4. The method of claim 3, wherein the sending includes concatenating at least a portion of such a pass to a reply address of an electronic message.

5. The method of claim 3, wherein the sending includes sending at least portion of such a pass in an attachment to an electronic message.

6. The method of claim 2, wherein such a notice includes a reference which points to a source for the pass.

7. The method of claim 6, wherein the source includes a web page.

8. A computer program product in a computer readable media for use in a data processing system for screening electronic messages, wherein such an electronic message has a reply address for a sender and an address for a designated receiver of the message, the computer program product comprising:
   first instructions for a screening agent for determining, for the designated receiver of such a one of the electronic messages, whether the electronic message includes a pass, the pass having been generated by the screening agent from an earlier-received version of the electronic message;
   second instructions for the screening agent for forwarding such a one of the electronic messages to the receiver, responsive to the message having such a pass;
   third instructions for the screening agent for generating such a pass for such a one of the electronic messages responsive to the message not having such a pass; and
   fourth instructions for the screening agent for generating a notice to the sender,—responsive to the such a one of the messages not having such a pass, including information making the pass available to the sender and requesting the sender to return the pass—to an indicated address, wherein the pass generated by the third instructions is particularized for the sender by including in the pass an encrypted version of the sender's address received in the electronic message, and wherein the first instructions include instructions for determining whether such a one of the electronic messages has such a pass and whether the encrypted address of the pass matches the message's sender address.

9. The computer program product of claim 8, wherein there are a plurality of the electronic messages, and the computer program product comprises:
   fifth instructions for the screening anent for intercepting the electronic messages for the designated receiver, wherein the first, second and third instructions are executed for each one of the respective electronic messages.

10. The computer program product of claim 9, wherein the computer program product comprises: sixth instructions for sending the respective passes to the respective senders at the reply addresses of the respective electronic messages.

11. The computer program product of claim 10, wherein the sending includes concatenating at least a portion of such a pass to a reply address of an electronic message.

12. The computer program product of claim 10, wherein the sending includes sending at least portion of such a pass in an attachment to an electronic message.

13. The computer program product of claim 9, wherein such a notice includes a reference which points to a source for the pass.

14. The computer program product of claim 13, wherein the source includes a web page.

15. A system for screening electronic messages, wherein such an electronic message has a reply address for a sender and an address for a designated receiver of the message, the system comprising:

first means for determining, by a screening agent for the designated receiver of such a one of the electronic messages, whether the electronic message includes a pass, the sass having been generated by the screening agent from an earlier-received version of the electronic message;

second means for forwarding such a one of the electronic messages by the screening agent to the receiver, responsive to the message having such a pass;

third means for generating such a pass for such a one of the electronic messages by the screening agent responsive to the message not having such a pass; and fourth means for generating a notice to the sender by the screening agent, responsive to such a one of the messages not having the pass, including information making the pass available to the sender and requesting the sender to return the pass to an indicated address, wherein the pass generated by the third means is particularized for the sender by the screening agent including in the pass an encrypted version of the sender's address received in the first one of the electronic message, and wherein the first means include means for determining whether such a one of the electronic messages has such a pass and whether the encrypted address of the pass matches the message's sender address.

16. The system of claim 15, wherein there are a plurality of electronic messages and the system comprises:

fifth means for intercepting the electronic messages by a screening agent for the designated receiver, wherein for each one of the respective electronic messages the first means determines, for a designated receiver of the respective one of the electronic messages, whether the electronic message includes a pass from the receiver, the second means forwards the electronic message to the receiver, responsive to the message having the pass, and the third means generates a notice to a sender of the message, responsive to the message not having the pass, wherein the notice includes information to advise the sender to return, to an indicated address, a pass for the electronic message generated on behalf of the designated receiver.

17. The system of claim 16, the system comprises:

means for sending the respective passes to the respective senders at the reply addresses of the respective electronic messages.

18. The system of claim 17, wherein the sending means includes means for concatenating at least a portion of such a pass to a reply address of an electronic message.

19. The system of claim 17, wherein the sending means includes means for sending at least portion of such a pass in an attachment to an electronic message.

20. The system of claim 16, wherein such a notice includes a reference which points to a source for the pass.

21. The system of claim 20, wherein the source includes a web page.

22. A screening agent apparatus for screening electronic messages, wherein such an electronic message has a reply address for a sender and an address for a designated receiver of the message, the screening agent apparatus comprising:

a pass detection agent that determines, for the designated receiver of such a one of the electronic messages, whether the electronic message includes a pass, the pass having been generated by the screening agent apparatus from an earlier-received version of the electronic message;

a forwarding agent, in communication with the pass detection agent, that forwards such a one of the electronic messages to the receiver, responsive to an indication by the pass detection agent that the message has such a pass; and a notification agent, in communication with the pass detection agent, that generates a pass for such a one of the electronic messages and a notice to the sender, responsive to an indication by the pass detection agent that the message does not have such a pass, including information making the pass available to the sender and requesting the sender to return the pass to an indicated address, wherein the pass generated by the notification agent is particularized for the sender by including in the pass an encrypted version of the sender's address received in the first one of the electronic messages, and wherein the pass detection agent determines whether such a one of the electronic messages has such a pass and whether the encrypted address of the pass matches the message's sender address.

23. The apparatus of claim 22, wherein there are a plurality of the electronic messages and the apparatus comprises:

an intercepting agent, in communication with the pass detection agent, for intercepting the first electronic messages for the designated receiver, wherein for each one of the respective electronic messages the pass detection agent determines, for a designated receiver of the respective one of the electronic messages, whether the electronic message includes a pass from the receiver, the forwarding agent forwards the electronic message to the receiver, responsive to the message having the pass, and the notification agent generates a notice to a sender of the message, responsive to the message not having the pass, the notice including information requesting the sender to return, to an indicated address, a pass for the electronic message.

24. The apparatus of claim 23, wherein the electronic messages have respective reply addresses, and the notification agent sends the respective passes to the respective senders at the reply addresses of the respective electronic messages.

25. The apparatus of claim 24, wherein the notification agent concatenates at least a portion of such a pass to a reply address of an electronic message.

26. The apparatus of claim 25, wherein the notification agent sends at least portion of such a pass in an attachment to an electronic message.

27. The apparatus of claim 24, wherein such a notice includes a reference which points to a source for the pass.

28. The apparatus of claim 27, wherein the source includes a web page.

* * * * *

UNITED STATES PATENT AND TRADEMARK OFFICE
CERTIFICATE OF CORRECTION

PATENT NO. : 6,829,631 B1
DATED : December 7, 2004
INVENTOR(S) : Forman et al.

It is certified that error appears in the above-identified patent and that said Letters Patent is hereby corrected as shown below:

Column 8,
Line 48, please delete "anent" and replace it with -- agent --.

Signed and Sealed this

Twenty-sixth Day of April, 2005

JON W. DUDAS
*Director of the United States Patent and Trademark Office*